(12) United States Patent
Johnson et al.

(10) Patent No.: US 7,800,395 B2
(45) Date of Patent: Sep. 21, 2010

(54) SYSTEMS, DEVICES, AND METHODS FOR CONTROLLABLY COUPLING QUBITS

(75) Inventors: Mark W. Johnson, Vancouver (CA); Paul I. Bunyk, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 1 day.

(21) Appl. No.: 12/113,753

(22) Filed: May 1, 2008

(65) Prior Publication Data

US 2008/0274898 A1  Nov. 6, 2008

Related U.S. Application Data

(60) Provisional application No. 60/915,657, filed on May 2, 2007.

(51) Int. Cl.
*H03K 19/195* (2006.01)

(52) U.S. Cl. .............................. 326/3; 326/1

(58) Field of Classification Search .................. 326/1–7
See application file for complete search history.

(56) References Cited

U.S. PATENT DOCUMENTS

| | | | | |
|---|---|---|---|---|
| 4,051,393 A * | 9/1977 | Fulton | ........................ | 327/367 |
| 4,496,854 A | 1/1985 | Chi et al. | ..................... | 307/306 |
| 4,937,525 A | 6/1990 | Daalmans | ................... | 324/248 |
| 5,128,675 A | 7/1992 | Harada | ........................ | 341/133 |
| 6,605,822 B1 | 8/2003 | Blais et al. | ..................... | 257/34 |
| 6,627,916 B2 | 9/2003 | Amin et al. | ..................... | 257/31 |
| 6,753,546 B2 | 6/2004 | Tzalenchuk et al. | ............ | 257/31 |
| 6,838,694 B2 | 1/2005 | Esteve et al. | ................... | 257/34 |
| 6,984,846 B2 | 1/2006 | Newns et al. | .................. | 257/31 |
| 7,051,393 B2 * | 5/2006 | Cox | ............................... | 15/30 |
| 7,133,888 B2 | 11/2006 | Kohn et al. | ................. | 708/446 |
| 7,335,909 B2 | 2/2008 | Amin et al. | ..................... | 257/34 |
| 7,605,600 B2 | 10/2009 | Harris | ........................... | 326/1 |
| 7,619,437 B2 | 11/2009 | Thom et al. | .................... | 326/5 |
| 7,639,035 B2 | 12/2009 | Berkley | .......................... | 326/2 |
| 2003/0038285 A1 | 2/2003 | Amin et al. | ..................... | 257/31 |
| 2003/0071258 A1 | 4/2003 | Zagoskin et al. | .............. | 257/31 |
| 2003/0224753 A1 | 12/2003 | Bremond et al. | ............ | 455/339 |
| 2004/0016918 A1 | 1/2004 | Amin et al. | ..................... | 257/14 |
| 2005/0001209 A1 | 1/2005 | Hilton et al. | ................... | 257/20 |
| 2005/0082519 A1 | 4/2005 | Amin et al. | ..................... | 257/13 |
| 2005/0250651 A1 | 11/2005 | Amin et al. | ................. | 505/846 |

(Continued)

FOREIGN PATENT DOCUMENTS

CA  2386426  5/2001

(Continued)

OTHER PUBLICATIONS

Farhi et al., "Quantum Adiabatic Evolution Algorithms versus Simulated Annealing," MIT-CTP #3228, arXiv:quant-ph/0201031 v1, pp. 1-16, Jan. 8, 2002.

(Continued)

*Primary Examiner*—Vibol Tan
*Assistant Examiner*—Dylan White
(74) *Attorney, Agent, or Firm*—Seed IP Law Group PLLC

(57) ABSTRACT

A coupling system to couple a first and a second qubit in response to a state of the coupling system that may be set by two input signals.

19 Claims, 8 Drawing Sheets

U.S. PATENT DOCUMENTS

| | | | |
|---|---|---|---|
| 2005/0256007 A1 | 11/2005 | Amin et al. | 505/170 |
| 2006/0097747 A1* | 5/2006 | Amin | 326/6 |
| 2006/0147154 A1 | 7/2006 | Thom et al. | 385/37 |
| 2006/0225165 A1 | 10/2006 | Maassen van den Brink et al. | 977/933 |
| 2007/0180586 A1 | 8/2007 | Amin | 977/755 |
| 2008/0238531 A1* | 10/2008 | Harris | 327/528 |
| 2008/0258753 A1* | 10/2008 | Harris | 326/4 |
| 2009/0078932 A1* | 3/2009 | Amin | 257/31 |
| 2009/0192041 A1 | 7/2009 | Johansson et al. | 505/170 |

FOREIGN PATENT DOCUMENTS

| | | |
|---|---|---|
| WO | 2004/102470 | 11/2004 |
| WO | 2005/093649 | 10/2005 |
| WO | 2006/024939 | 3/2006 |

OTHER PUBLICATIONS

Feynman, "Simulating Physics with Computers," *International Journal of Theoretical Physics* 21(6/7): 467-488, 1982.

Harris et al., "Sign and Magnitude Tunable Coupler for Superconducting Flux Qubits," arXiv:cond-mat/0608253 v1, Aug. 11, 2006.

Maassen van den Brink et al., "Mediated tunable coupling of flux qubits," *New Journal of Physics* 7:1-18, 2005.

Makhlin et al., "Quantum-state engineering with Josephson-junction devices," *Reviews of Modern Physics* 73(2): 357-400, Apr. 2001.

Nielsen et al., *Quantum Computation and Quantum Information*, Cambridge University Press, Cambridge, 2000, "7.8 Other implementation schemes," pp. 343-345.

Shor, "Introduction to Quantum Algorithms," AT&T Labs—Research, arXiv:quant-ph/0005003 v2, pp. 1-17, Jul. 6, 2001.

U.S. Appl. No. 60/915,657, filed May 3, 2007, Johnson et al.

"A High-Level Look at Optimization: Past, Present and Future," e-Optimization.Community, May 2000, pp. 1-5.

Allen et al., "Blue Gene: A Vision for Protein Science Using a Petaflop Supercomputer," *IBM Systems Journal* 40(2):310-327, 2001.

Amin et al., "Decoherence in Adiabatic Quantum Computation," arXiv:0708.0384v1 [cond-mat.mes-hall], pp. 1-4, Aug. 2, 2007.

Amin M.H., "Systems, Devices and Methods for Controllably Coupling Qubits," U.S. Appl. No. 60/975,083, filed Sep. 25, 2007.

Averin et al., "Variable Electrostatic Transformer: Controllable Coupling of Two Charge Qubits," *Physical Review Letters* 91(5):057003-1-057003-4, Aug. 1, 2003.

Berkley et al., "Scalable Superconducting Flux Digital-to-Analog Conversion Using a Superconducting Inductor Ladder Circuit," U.S. Appl. No. 60/917,884, filed May 14, 2007.

Berkley et al., "Systems, Methods and Apparatus for Local Programming of Quantum Processor Elements," U.S. Appl. No. 11/950,276, filed Dec. 4, 2007.

Berkley, A.J., "Architecture for Local Programming of Quantum Processor Elements Using Latching Qubits," U.S. Appl. No. 12/109,847, filed Apr. 25, 2008.

Biamonte et al., "Physical Implementations for a Universal Quantum Computer and Related Coupling Devices," U.S. Appl. No. 60/910,445, filed Apr. 5, 2007.

Biamonte et al., "Realizable Hamiltonians for Universal Adiabatic Quantum Computers," arXiv:0704.1287v1 [quant-ph], pp. 1-4, Apr. 10, 2007.

Biamonte et al., "Physical Realizations of a Universal Adiabatic Quantum Computer," U.S. Appl. No. 12/098,348, filed Apr. 4, 2008.

Blatter et al., "Design aspects of superconducting-phase quantum bits," *Physical Review B* 63:174511-1-174511-9, 2001.

Bocko et al., "Prospects for Quantum Coherent Computation Using Superconducting Electronics," *IEEE Transactions on Applied Superconductivity* 7(2):3638-3641, 1997.

Brennen et al., "Why Should Anyone Care About Computing with Anyons?," arXiv:0704.2241v1, pp. 1-19, Apr. 18, 2007.

Bunyk et al., "Systems, Methods and Apparatus for Digital-to-Analog Conversion of Superconducting Magentic Flux Signals," U.S. Appl. No. 12/120,354, filed May 14, 2008.

Butcher, "Advances in Persistent-Current Qubit Research: Inductively Coupled Qubits and Novel Biasing Methods," Graduate Thesis, Delft University of Technology, 52 pages, Jan. 10, 2002.

Choi, V., "Systems, Devices, and Methods for Analog Processing," U.S. Appl. No. 60/986,554, filed Nov. 8, 2007.

Choudhury, *Handbook of Microlithography, Micromachining and Microfabrication Vol. 1: Microlithography*, The International Society for Optical Engineering, Bellingham, WA, 1999.

Clarke et al., "Quiet Readout of Superconducting Flux States," *Physica Scripta*. T102:173-177, 2002.

Cosmelli et al., "Controllable Flux Coupling for the Integration of Flux Qubits," arXiv:cond-mat/0403690v1, pp. 1-10, Mar. 29, 2004.

Deutsch, "Quantum theory, the Church-Turing principle and the universal quantum computer," Appeared in *Proceedings of the Royal Society of London A* 400: 97-117, 1985.

Dolan et al., "Optimization on the NEOS Server," from *SIAM News* 35(6): 1-5, Jul./Aug. 2002.

Filippov et al., "Tunable Transformer for Qubits Based on Flux States," *IEEE Transactions on Applied Superconductivity* 13(2): Jun. 1-4, 2003.

Fourer et al., "Optimization as an Internet Resource," *INTERFACES* 31(2): 130-150, Mar.-Apr. 2001.

Friedman et al., "Quantum superposition of distinct macroscopic states," *Nature* 406: 43-46, Jul. 6, 2000.

Fritzsch et al., SNS and SIS Josephson junctions with dimensions down to the sub-µm region prepared by an unified technology, *Supercond. Sci. Tech.* 12: 880-882, 1999.

Ghiu et al., "Asymmetric two-output quantum processor in any dimension," arXiv:quant-ph/0610138v1, pp. 1-8, Oct. 17, 2006.

Hillery et al., "Approximate programmable quantum processors," arXiv:quant-ph/0510161v1, pp. 1-7, Oct. 20, 2005.

Hioe, *Quantum Flux Parametron—A Single Quantum Flux Superconducting Logic Device*, World Scientific Publishing Co. Pte. Ltd., Singapore, pp. 23-43, 1991.

Harris, R.G., "Systems, Devices, and Methods for Controllably Coupling Qubits," U.S. Appl. No. 12/017,995, filed Jan. 22, 2008.

Il'ichev et al., "Continuous Monitoring of Rabi Oscillations in a Josephson Flux Qubit," *Physical Review Letters* 91(9): 097906-1-097906-4, week ending Aug. 29, 2003.

Inokuchi et al., "Analog Computation using Quantum-Flux Parametron Devices," *Physica C*, 357-360, pp. 1618-1621, Department of Electrical Engineering, Hokkaido University, Kita 13, Nishi 8, Sapporo 060-8628, Japan, Jan. 12, 2001.

Ioffe et al., "Environmentally Decoupled sds-wave Josephson Junctions for Quantum Computing," *Nature* 398:679-681, 1999.

Kaiser et al., "Coherent Atomic Matter Waves: Proceedings of the Les Houches Summer School, Session LXXII in 1999," Springer-Verlag, New York, ISBN 286883499X, pp. 184-188, 294-295, 302-303.

Koch et al., "Model for 1/f Flux Noise in SQUIDs and Qubits," pp. 1-14, May 5, 2007.

Levinson, *Principles of Lithography*, The International Society for Optical Engineering, Bellingham, WA, 2001.

Levitov et al., "Quantum spin chains and Majorana states in arrays of coupled qubits," arXiv:cond-mat/0108266v2, pp. 1-7, Aug. 19, 2001.

Madou, *Fundamentals of Microfabrication*, Second Edition, CRC Press LLC, Boca Raton, Florida, 2002.

Maibaum et al., "Systems, Methods and Apparatus for a Differential Superconducting Flux Digital-to-Analog Converter," U.S. Appl. No. 60/975,487, filed Sep. 26, 2007.

Maibaum et al., "Systems, Devices, and Methods for Analog Processing," U.S. Appl. No. 61/039,710, filed Mar. 26, 2008.

Majer et al., "Spectroscopy on Two Coupled Flux Qubits", arXiv:cond-mat/0308192 v1, Aug. 10, 2003.

Mc Hugh et al., "A quantum computer using a trapped-ion spin molecule and microwave radiation," arXiv:quant-ph/0310015v2, pp. 1-9, Apr. 13, 2004.

Mooij et al., "Josephson Persistent-Current Qubit," *Science* 285: 1036-1039, Aug. 13, 1999.

Nielsen, "Cluster-State Quantum Computation," arXiv:quant-ph/0504097v2, pp. 1-15, Jul. 1, 2005.

Nielsen et al., *Quantum Computation and Quantum Information*, Cambridge University Press, Cambridge, 2000, Chapter 7, "Quantum computers: physical realization," pp. 277-352.

Orlando et al., "Superconducting persistent-current qubit," *Physical Review B* 60(22): 15 398-15 413, Dec. 1, 1999.

Paternostro et al., "Quantum-State Transfer in Imperfect Artificial Spin Networks," *Physical Review A* 71(4):042311, 2005.

Plourde et al., "Entangling flux qubits with a bipolar dynamic inductance," *Physical Review B* 70(140501-R): 1-4, 2004.

Rose, G., "Analog Processor with Quantum Devices," U.S. Appl. No. 60/638,600, filed Dec. 23, 2004.

Rose et al., "Systems, Devices, and Methods for Interconnected Processor Topology," U.S. Appl. No. 12/013,192, filed Jan. 11, 2008.

Ryan et al., "Characterization of complex quantum dynamics with a scalable NMR information processor," arXiv:quant-ph/0506085v2, pp. 1-4, Feb. 13, 2006.

Shirts et al., "Computing: Screen Savers of the Word Unite!," *Science Online* 290(5498): 1903-1904, Dec. 8, 2000.

Shnirman et al., "Quantum Manipulations of Small Josephson Junctions," *Physical Review Letters* 79(12): 2371-2374, Sep. 22, 1997.

Shoji et al., "New fabrication process for Josephson tunnel junctions with (niobium nitride, niobium) double-layered electrodes," *Appl. Phys. Lett.* 41(11): 1097-1099, Dec. 1, 1982.

Thaker et al., "Quantum Memory Hierarchies: Efficient Designs to Match Available Parallelism in Quantum Computing " arXiv:quant-ph/0604070v1, 12 pages, Apr. 10, 2006.

Van Zant, *Microchip Fabrication*, Fourth Edition, McGraw-Hill, New York, 2000.

Vlasov, "Von Neumann Quantum Processors," arXiv:quant-ph/0311196v1, pp. 1-8, Nov. 27, 2003.

Williams et al., *Explorations in Quantum Computing*, Springer, New York, Dec. 12, 1997, Chapter 11, "How to Make a Quantum Computer," pp. 241-265.

International Search Report for PCT/CA2008/000138, mailed May 20, 2008, 3 pages.

International Search Report for PCT/CA2008/000660, mailed Jul. 25, 2008, 4 pages.

International Search Report for PCT/CA2008/001778, mailed Jan. 21, 2009, 3 pages.

Written Opinion for PCT/CA2008/000660, mailed Jul. 25, 2008, 2 pages.

Preliminary Amendment filed Jun. 18, 2009 in U.S. Appl. No. 12/017,995, 7 pages.

Office Action mailed Sep. 3, 2009 in U.S. Appl. No. 12/017,995, 11 pages.

\* cited by examiner

SYSTEMS, DEVICES, AND METHODS FOR CONTROLLABLY COUPLING QUBITS

CROSS REFERENCE TO RELATED APPLICATIONS

This application claims benefit under 37 C.F.R. 119(e) of U.S. Provisional Patent Application Ser. No. 60/915,657, filed May 2, 2007, entitled "Systems, Devices, and Methods for Controllably Coupling Qubits", which is incorporated herein by reference in its entirety.

BACKGROUND

1. Field

The present disclosure generally relates to superconducting computing, for example analog or quantum computing employing processors that operate at superconducting temperatures.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-24.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2 e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. For practical superconducting quantum computing systems, superconducting qubits are coupled together. See e.g., U.S. Pat. No. 6,838,694 and U.S. Patent Application No. 2005-0082519.

Persistent Current Coupler

In FIG. 1A shows schematic diagram of a controllable coupler 100. This coupler is a loop of superconducting material 101 interrupted by a single Josephson junction 102 and is used to couple a first qubit 110 and a second qubit 120 for use in an analog computer. The first qubit 110 is comprised of a loop of superconducting material 111 interrupted by a compound Josephson junction 112 and is coupled to the controllable coupler 100 through the exchange of flux 103 between the coupler 100 and the first qubit 110. The second qubit 120 is comprised of a loop of superconducting material 121 interrupted by a compound Josephson junction 122 and is coupled to the controllable coupler 100 through the exchange of flux 104 between the coupler 100 and the second qubit 120. Flux 105 created by electrical current flowing through a magnetic flux transformer 130 is applied to the loop of superconducting material 101.

Flux 105 produced by the magnetic flux transformer 130 is applied to the loop of superconducting material 101 and controls the state of the controllable coupler 100. The controllable coupler 100 is capable of producing a zero coupling between the first qubit 110 and the second qubit 120, an anti-ferromagnetic coupling between the first qubit 110 and the second qubit 120, and a ferromagnetic coupling between the first qubit 110 and the second qubit 120.

FIG. 1B shows an exemplary two-pi-periodic graph 150B giving the relationship between the persistent current (I) flowing within the loop of superconducting material 101 of the controllable coupler 100 (Y-axis) as a function of the flux ($\Phi_x$) 105 from the magnetic flux transformer 130 applied to the loop of superconducting material 101 and scaled with the superconducting flux quantum $\Phi_0$ (X-axis).

Zero coupling exists between the first qubit 110 and the second qubit 120 when the coupler 100 is set to point 160B or any other point along the graph 150B with a similar slope of about zero of point 160B. Anti-ferromagnetic coupling exists between the first qubit 110 and the second qubit 120 when the coupler 100 is set to the point 170B or any other point along the graph 150 with a similar positive slope of point 170B. Ferromagnetic coupling exists between the first qubit 110 and the second qubit 120 when the coupler 100 is set to the point 180B or any other point along the graph 150 with a similar negative slope of point 180B.

The coupler is set to states 160B, 170B and 180B by adjusting the amount of flux 105 coupled between the magnetic flux transformer 130 and the loop of superconducting material 101. The state of the coupler is dependant upon the slope of the graph 150B. For $dI/d\Phi_x$ equal to zero, the coupler is said to produce a zero coupling or non-coupling state where the quantum state of the first qubit 110 does not interact with the state of the second qubit 120. For $dI/d\Phi_x$ greater than zero, the coupler is said to produce an anti-ferromagnetic coupling where the state of the first qubit 110 and the state of the second qubit 120 will be dissimilar in their lowest energy state. For $dI/d\Phi_x$ less than zero, the coupler is said to produce a ferromagnetic coupling where the state of the first qubit 110 and the state of the second qubit 120 will be similar in their lowest energy state. Those of skill in the art would appreciate that depending upon the configuration of the coupler; anti-ferromagnetic coupling may be associated with $dI/d\Phi_x$ less than zero whereas ferromagnetic coupling may be associated with $dI/d\Phi_x$ greater than zero. From the zero coupling state with corresponding flux level 161, the amount of flux ($\Phi_x$) 105 produced by the magnetic flux transformer 130 applied to the loop of superconducting material 101 can be decreased to a flux level 171 to produce an anti-ferromagnetic coupling between the first qubit 110 and the second qubit 120 or increased to a flux level 181 to produce a ferromagnetic coupling between the first qubit 110 and the second qubit 120.

Examining the persistent current 162 that exists at the zero coupling point 160B, with corresponding zero coupling applied flux 161, shows a large persistent current is coupled into the first qubit 110 and the second qubit 120. This is not ideal as there may be unintended interactions between this persistent current flowing through the controllable coupler 100 and other components within the analog processor in which the controllable coupler 100 exists. Both anti-ferromagnetic coupling persistent current level 172 and ferromagnetic coupling persistent current level 182 may be of similar magnitudes as compared to zero coupling persistent current level 162 thereby causing similar unintended interactions between the persistent current of the coupler 100 and other components within the analog processor in which the controllable coupler 100 exists. Anti-ferromagnetic coupling persistent current level 172 and ferromagnetic coupling persistent current level 182 may be minimized such that the persistent current levels 172 and 182 are about zero during regular operations.

FIG. 1C shows a graph 150C giving the relationship between the coupling strength (of arbitrary units) between the first qubit 110 and the second qubit 120 (Y-axis) as a function of the flux bias 105 from the magnetic flux transformer 130 applied to the loop of superconducting material 101 and scaled by the superconducting flux quantum $\Phi_0$ (X-axis).

Zero coupling exists between the first qubit 110 and the second qubit 120 when the coupler 100 is set to point 160C or any other point along the graph 150C with a similar coupling strength of zero as is exhibited by point 160C. Anti-ferromagnetic coupling exists between the first qubit 110 and the second qubit 120 when the coupler 100 is set to the point 170C or any other point along the graph 150C with a coupling strength greater than zero as is exhibited by point 170C. Ferromagnetic coupling exists between the first qubit 110 and the second qubit 120 when the coupler 100 is set to the point 180B or any other point along the graph 150C with a coupling strength less than zero as is exhibited by point 180C.

The coupling response of the controllable coupler 100 to an applied flux bias 105 is very non-symmetric in nature in relation to anti-ferromagnetic and ferromagnetic responses. When anti-ferromagnetic coupling is created, adjustments to the amount of flux bias 105 applied to the loop of superconducting material 101 can be conducted over a large region of applied flux 105 while affecting the anti-ferromagnetic coupling very little. For example, applying a flux 105 of approximately $-0.5\Phi_0$ to $0.5\Phi_0$ to the loop of superconducting material 101 results in anti-ferromagnetic coupling produced by the controllable coupler 100 between the first qubit 110 and the second qubit 120. When ferromagnetic coupling is created, adjustments to the amount of flux bias 105 applied to the loop of superconducting material 101 can be conducted over only a very small region of applied flux 105 while maintaining the ferromagnetic coupling state. For example, applying a flux 105 of approximately $0.95\Phi_0$ to $1.05\Phi_0$ to the loop of superconducting material 101 results in ferromagnetic coupling produced by the controllable coupler 100 between the first qubit 110 and the second qubit 120. Therefore it can be seen that while one form of coupling is attainable with limited precision with regards to control over the amount of flux bias 105 being applied to the loop of superconducting material 101, a coupling requires much greater precision. Also, zero coupling requires a very precise amount of flux bias 105 to be applied to the superconducting loop 101 to be achieved. Without very accurate control over the flux bias 105 being applied to the controllable coupler 100, the coupling produced by the controllable coupler 100 may not, in practice be what is desired.

For further discussion of the persistent current couplers, see e.g., Harris, R., "Sign and Magnitude Tunable Coupler for Superconducting Flux Qubits", arXiv.org: cond-mat/ 0608253 (2006), pp. 1-5, and van der Brink, A. M. et al., "Mediated tunable coupling of flux qubits," New Journal of Physics 7 (2005) 230.

BRIEF SUMMARY

One aspect may be summarized as a coupling system to couple a first qubit and a second qubit, that includes a first loop of superconducting material; a second loop of superconducting material; a first Josephson junction interrupting the first and the second loops of superconducting material; a second Josephson junction interrupting the second loop of superconducting material; a first magnetic flux inductor that forms at least a portion of a first mutual inductance interface to inductively couple the first loop of superconducting material with the first qubit; a second magnetic flux inductor that forms at least a portion of a second mutual inductance interface to inductively couple the first and the second loops of superconducting material with the second qubit; a third magnetic flux inductor forming a third mutual inductance interface to inductively couple the first loop to a first coupling state control structure; and a fourth magnetic flux inductor forming a fourth mutual inductance interface to inductively couple the second loop to a second coupling state structure.

Another aspect may be summarized as a method of controllably coupling a first qubit and a second qubit with a coupling system that includes coupling the first qubit to the coupling system through a first mutual inductance interface; coupling the second qubit to the coupling system through a second mutual inductance interface; applying a first amount of flux to the coupling system through a third mutual inductance interface; applying a second amount of flux to the coupling system through a fourth mutual inductance interface; and wherein the first qubit and the second qubit are essentially magnetically isolated from each other when the first amount of flux is zero and the second amount of flux is approximately zero.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1A:
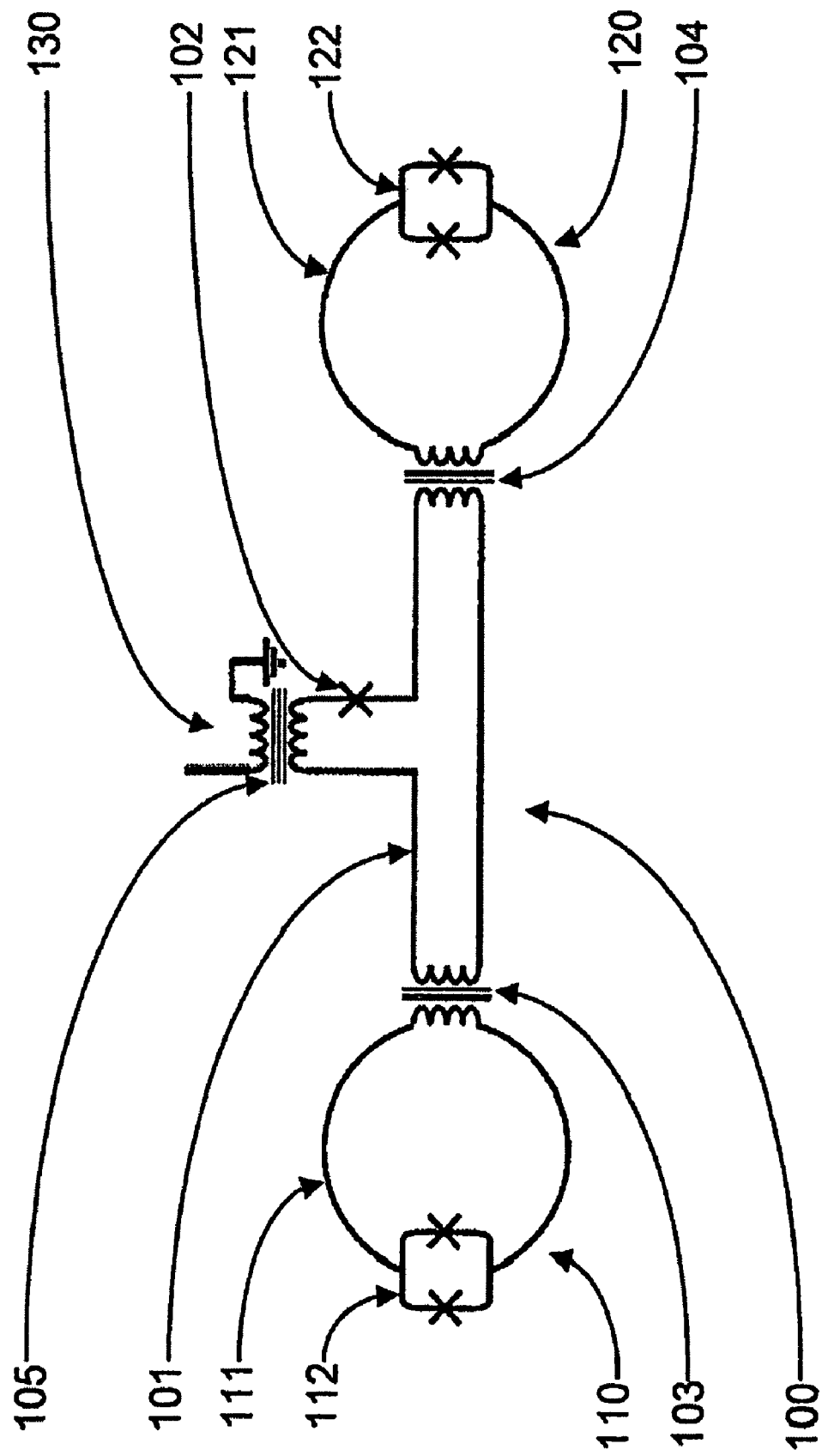
FIG. 1A is a schematic diagram of a controllable coupler according to the prior art.
Figure 1B:
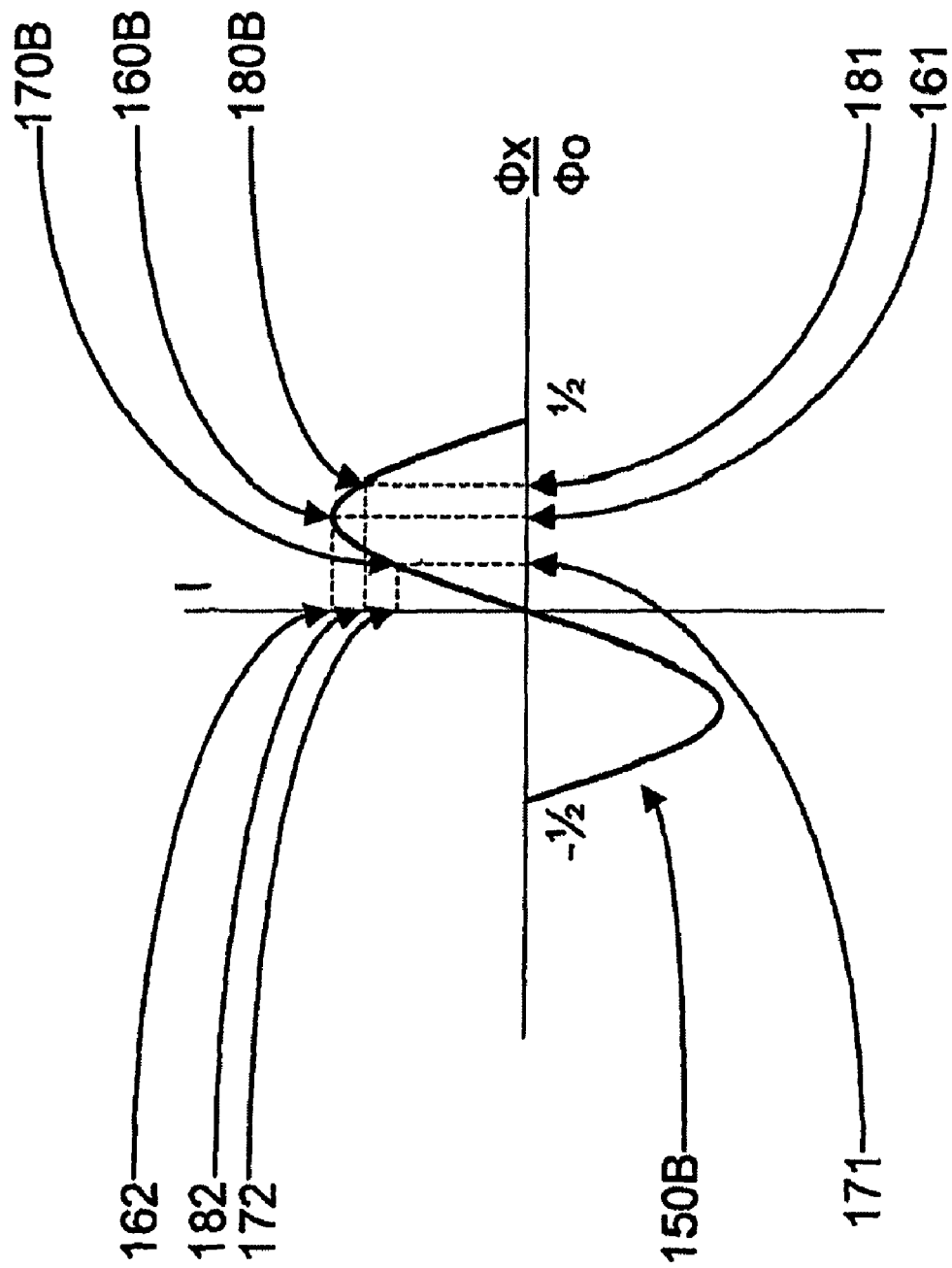
FIG. 1B is a graph of persistent current versus magnetic flux applied to a loop of superconducting material of a controllable coupler according to the prior art.
Figure 1C:
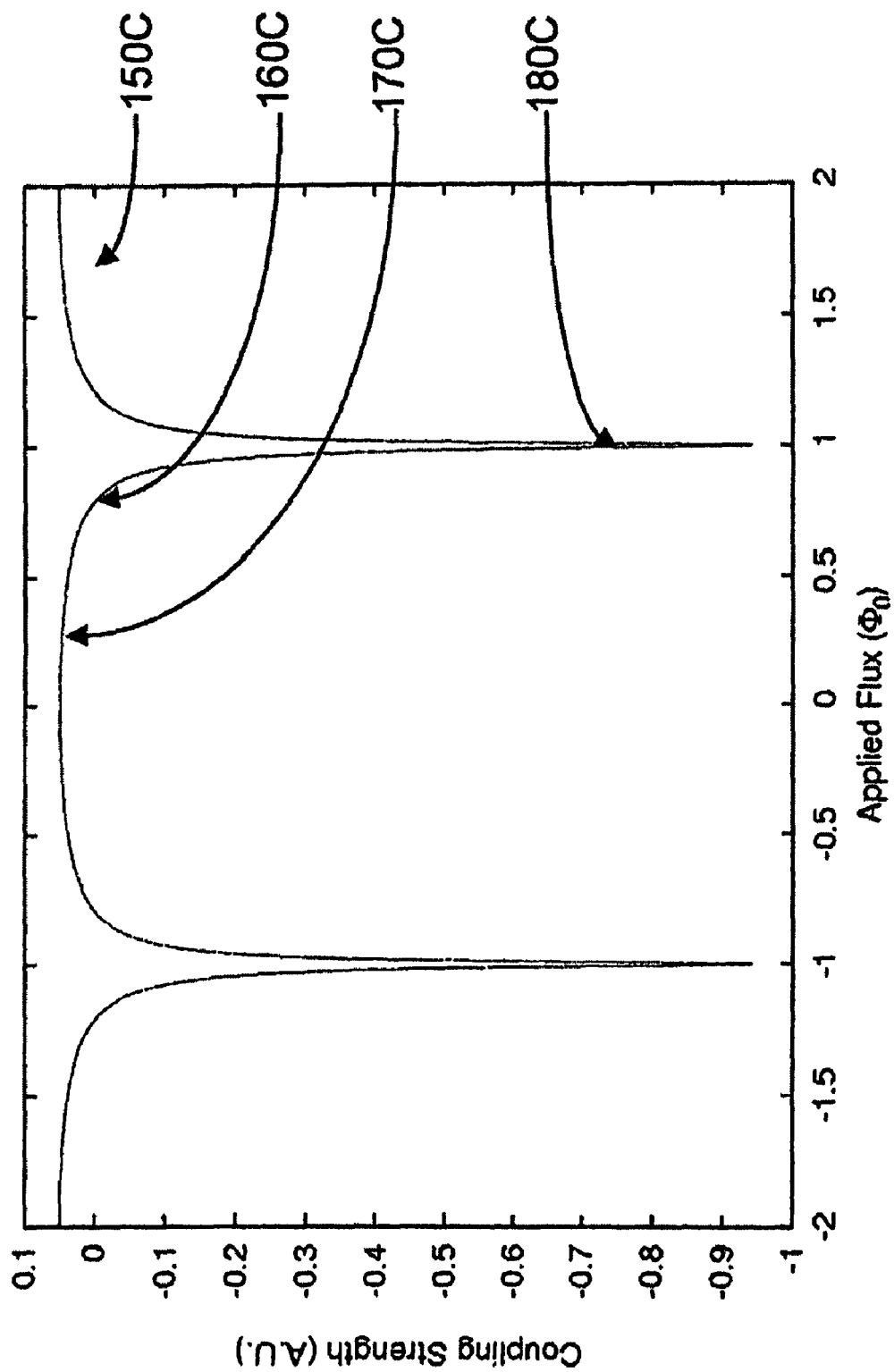
FIG. 1C is a graph of coupling strength versus magnetic flux applied to a loop of superconducting material of a controllable coupler according to the prior art.
Figure 2A:
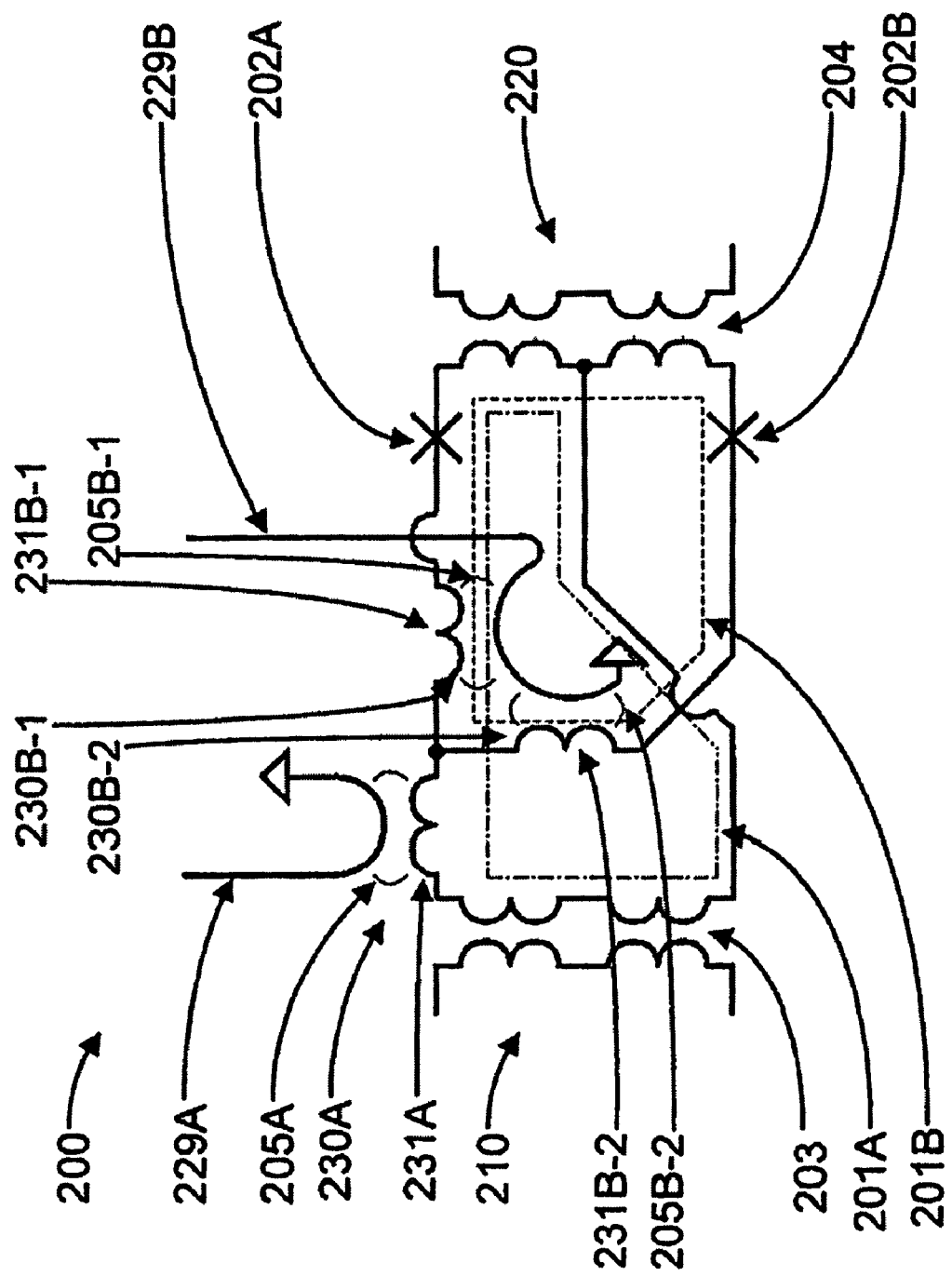
FIG. 2A is a schematic diagram of an embodiment of a superconducting controllable coupler system.

FIG. 2A shows schematic diagram of a controllable coupler 200 according to one illustrated embodiment. Controllable coupler 200 includes two loops of inter-woven superconducting material, a first loop 201A and a second loop 201B. First loop 201A is interrupted by a single Josephson junction 202A and second loop 201B is interrupted by two Josephson junctions 202A and 202B, where 202A is a part of both first loop 201A and second loop 201B. Controllable coupler 200 is used to couple a first qubit 210 and a second qubit 220 for use in an analog computer. First qubit 210 is coupled to controllable coupler 200 through the exchange of flux 203 between coupler 200 and first qubit 210. Second qubit 220 is coupled to controllable coupler 200 through the exchange of flux 204 between coupler 200 and second qubit 220. Qubit 210 and qubit 220 are, in some embodiments, superconducting flux qubits.

A state of the controllable coupler 200 is controlled by signals received via a first and a second state control structures 229A, 229B, respectively. Flux 205A created by electrical current flowing through first state control structure 229A is applied to first loop of superconducting material 201A. First state control structure 229A may, for example, take the form of a magnetic flux inductor, which along with a counterpart inductor 231A in first loop of superconductor material 201A forms a magnetic flux transformer 230A. Flux 205B-1 and flux 205B-2 created by electrical current flowing through second state control structure 229B is applied to second loop of superconducting material 201B. Second state control structure 229B may, for example, take the form of one or more inductors, which along with counterpart inductors 231B-1, 231B-2 in the second loop of superconducting material 201A, 201B forms a magnetic flux transformers 230B-1, 230B-2 (collectively 230B).

Flux 205A produced by the magnetic flux transformer 230A, which is applied to the first loop 201A, together with flux 205B-1 and flux 205B-2 produced by magnetic flux transformers 230B-1, 230B-2, which is effectively applied to second loop 201B, controls the state of controllable coupler 200. Controllable coupler 200 is capable of producing a zero coupling between first qubit 210 and second qubit 220, an anti-ferromagnetic coupling between first qubit 210 and second qubit 220, and a ferromagnetic coupling between first qubit 210 and second qubit 220. Depending upon the ratio and magnitude of flux produced by magnetic flux transformers 230A and 230B, controllable coupler 200 can be capable of only producing a zero coupling between first qubit 210 and second qubit 220 and an anti-ferromagnetic coupling between first qubit 210 and second qubit 220. Depending upon the ratio and magnitude of flux produced by magnetic flux transformers 230A and 230B, controllable coupler 200 can be capable of only producing a zero coupling between first qubit 210 and second qubit 220 and a ferromagnetic coupling between first qubit 210 and second qubit 220.

Figure 2B:
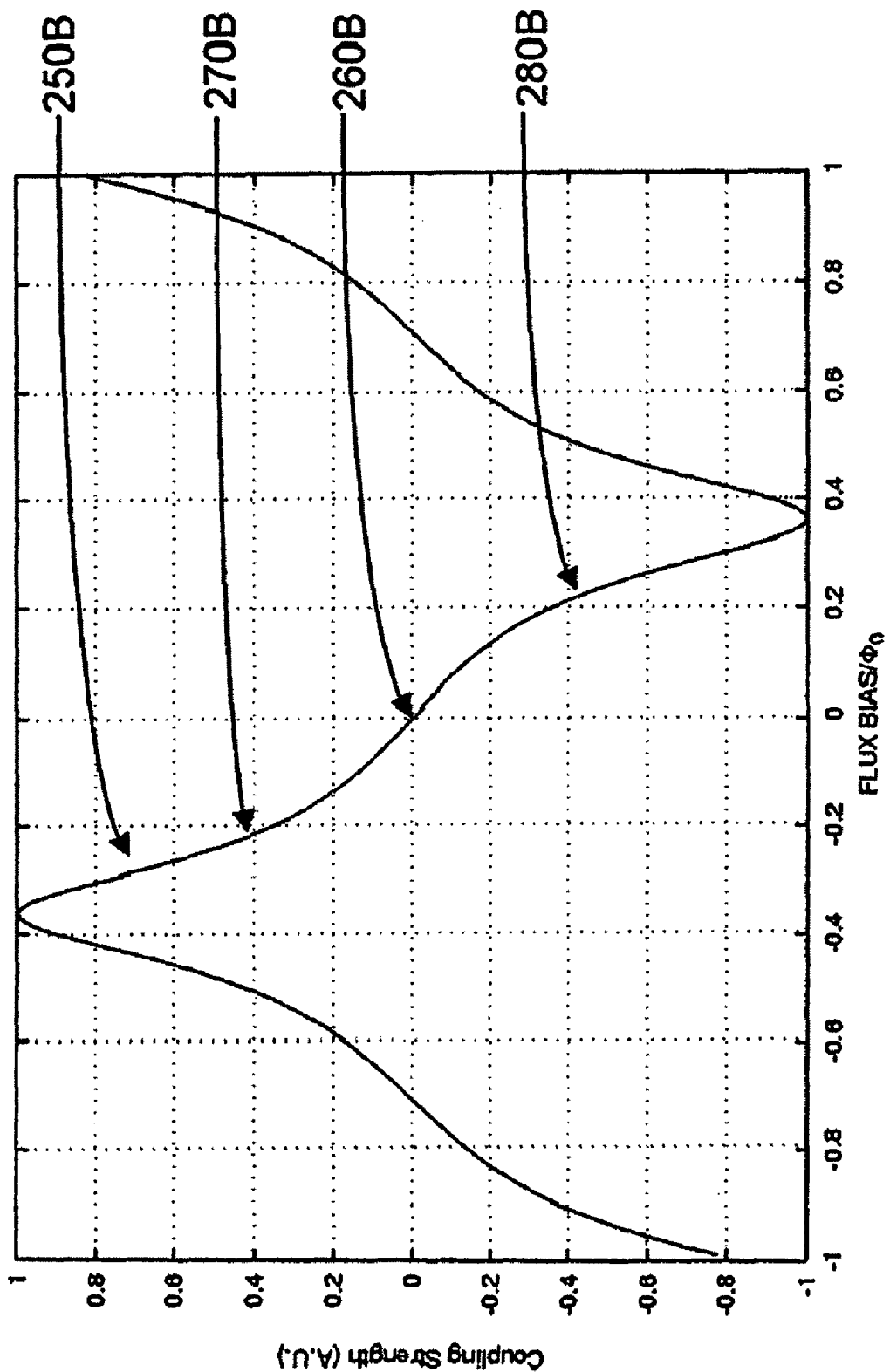
FIG. 2B is a graph of coupling strength versus magnetic flux applied to a loop of superconducting material of a controllable coupler.

FIG. 2B shows an exemplary graph 250B giving the relationship between the coupling strength (of arbitrary units) between first qubit 210 and second qubit 220 (Y-axis) as a function of flux bias 205A from the magnetic flux transformer 230A applied to first loop of superconducting material 201A and scaled by the superconducting flux quantum $\Phi_0$ (X-axis). Note that flux 205B (the sum of flux 205B-1 and 205B-2) created by electrical current flowing through magnetic flux transformers 230B-1, 230B-2 is produced with a magnitude of approximately $0.25\Phi_0$.

Zero coupling exists between first qubit 210 and second qubit 220 when coupler 200 is set to point 260B or any other point along the graph 250B with a similar coupling strength of zero as is exhibited by point 260B. Anti-ferromagnetic coupling exists between first qubit 210 and second qubit 220 when coupler 200 is set to point 270B or any other point along graph 250B with a coupling strength greater than zero as is exhibited by point 270B. Ferromagnetic coupling exists between first qubit 210 and second qubit 220 when coupler 200 is set to point 280B or any other point along graph 250B with a coupling strength less than zero as is exhibited by point 280B. There may exist direct magnetic coupling interactions between first qubit 210 and second qubit 220 wherein an inherent coupling exists between first qubit 210 and second qubit 220 when no flux 205A or 205B (the sum of flux 205B-1 and 205B-2) created by electrical current flowing through magnetic flux transformers 230B-1, 230B-2 is produced.

The symmetric nature of the coupling response of graph 250B is very desirable. It allows for predictable operations of controllable coupler 200 without undue testing and analysis to precisely quantify the response of controllable coupler 200 as flux bias 205A is manipulated. Also, there exists a well defined zero coupling state 260B attainable when about zero flux bias 205A applied to the controllable coupler 200.

Figure 2C:
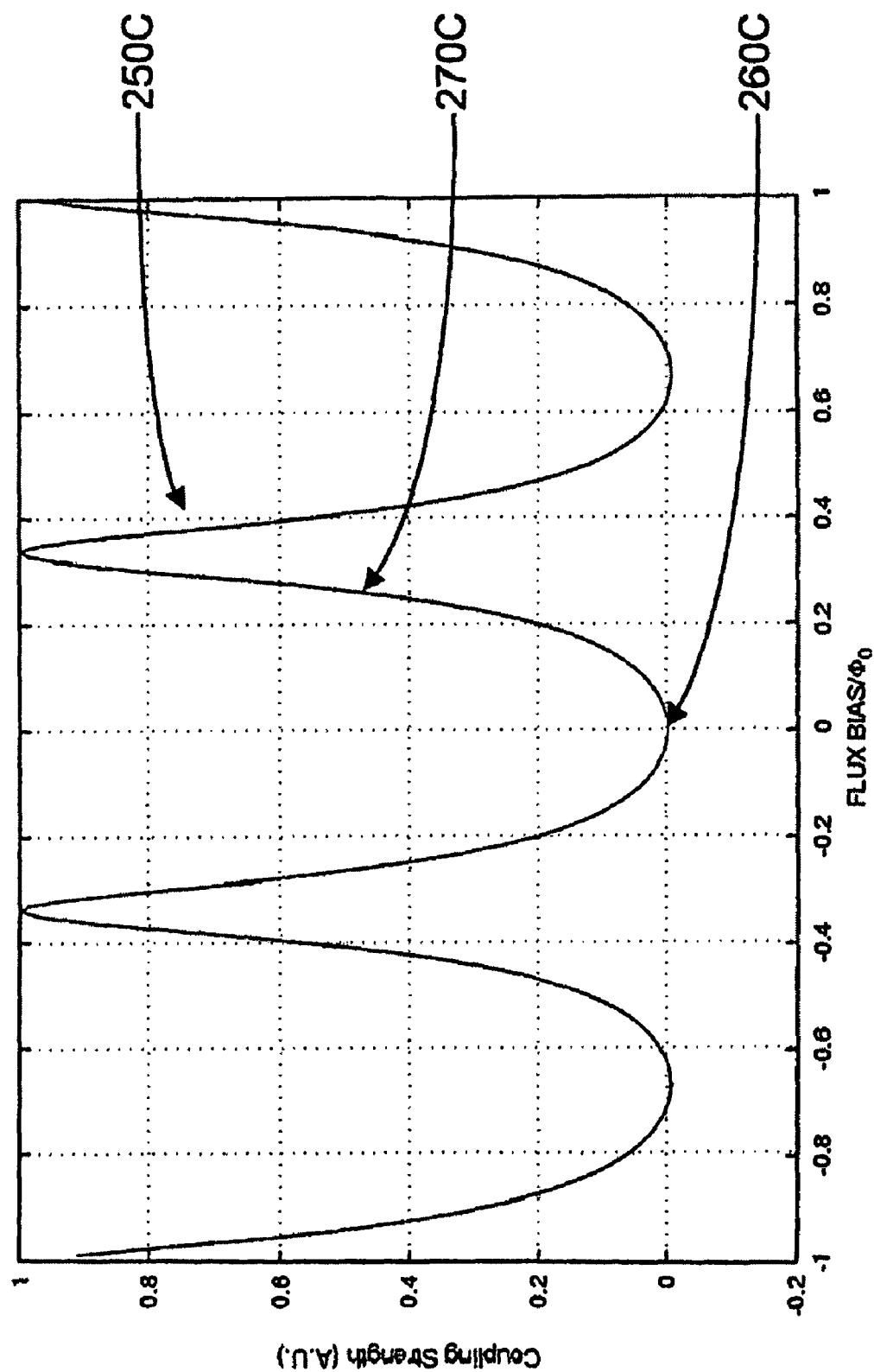
FIG. 2C is a graph of coupling strength versus magnetic flux applied to a loop of superconducting material of a controllable coupler.

FIG. 2C shows an exemplary graph 250C giving the relationship between the coupling strength (of arbitrary units) between first qubit 210 and second qubit 220 (Y-axis) as a function of flux bias 205A from magnetic flux transformer 230A applied to first loop of superconducting material 201A scaled by the superconducting flux quantum $\Phi_0$ (X-axis). Note that flux 205B (the sum of flux 205B-1 and 205B-2) created by electrical current flowing through magnetic flux transformers 230B-1, 230B-2 is produced with about equal magnitude and direction as that produced by flux bias 205A from magnetic flux transformer 230A.

Zero coupling exists between first qubit 210 and second qubit 220 when coupler 200 is set to point 260C or any other point along the graph 250C with a similar coupling strength of zero as is exhibited by point 260C. Anti-ferromagnetic coupling exists between first qubit 210 and second qubit 220 when coupler 200 is set to point 270C or any other point along graph 250C with a coupling strength greater than zero as is exhibited by point 270C. There may exist direct magnetic coupling interactions between first qubit 210 and second qubit 220 wherein an inherent coupling exists between first qubit 210 and second qubit 220 when no flux 205A or 205B (the sum of flux 205B-1 and 205B-2) created by electrical current flowing through magnetic flux transformers 230B-1, 230B-2 is produced.

A well defined zero coupling state 260C is attainable with about zero flux bias 205A and 205B applied to the controllable coupler 200 in this embodiment of controllable coupler 200. Having a zero-coupling state as the "off" state of the controllable coupler 200 is a desirable characteristic of any coupler within a analog or quantum system. Since persistent current couplers' "off" state does not produce zero coupling, an iterative process is required during calibration of analog or quantum systems which incorporate persistent current couplers 100. This is a very difficult and time consuming process as before a qubit can be calibrated, the zero coupling state of couplers surrounding the qubit must be found. Couplers having an "off" state which produces zero-coupling allows for calibration of the analog or quantum system in a much more straight-forward and less-iterative approach.

Figure 2D:
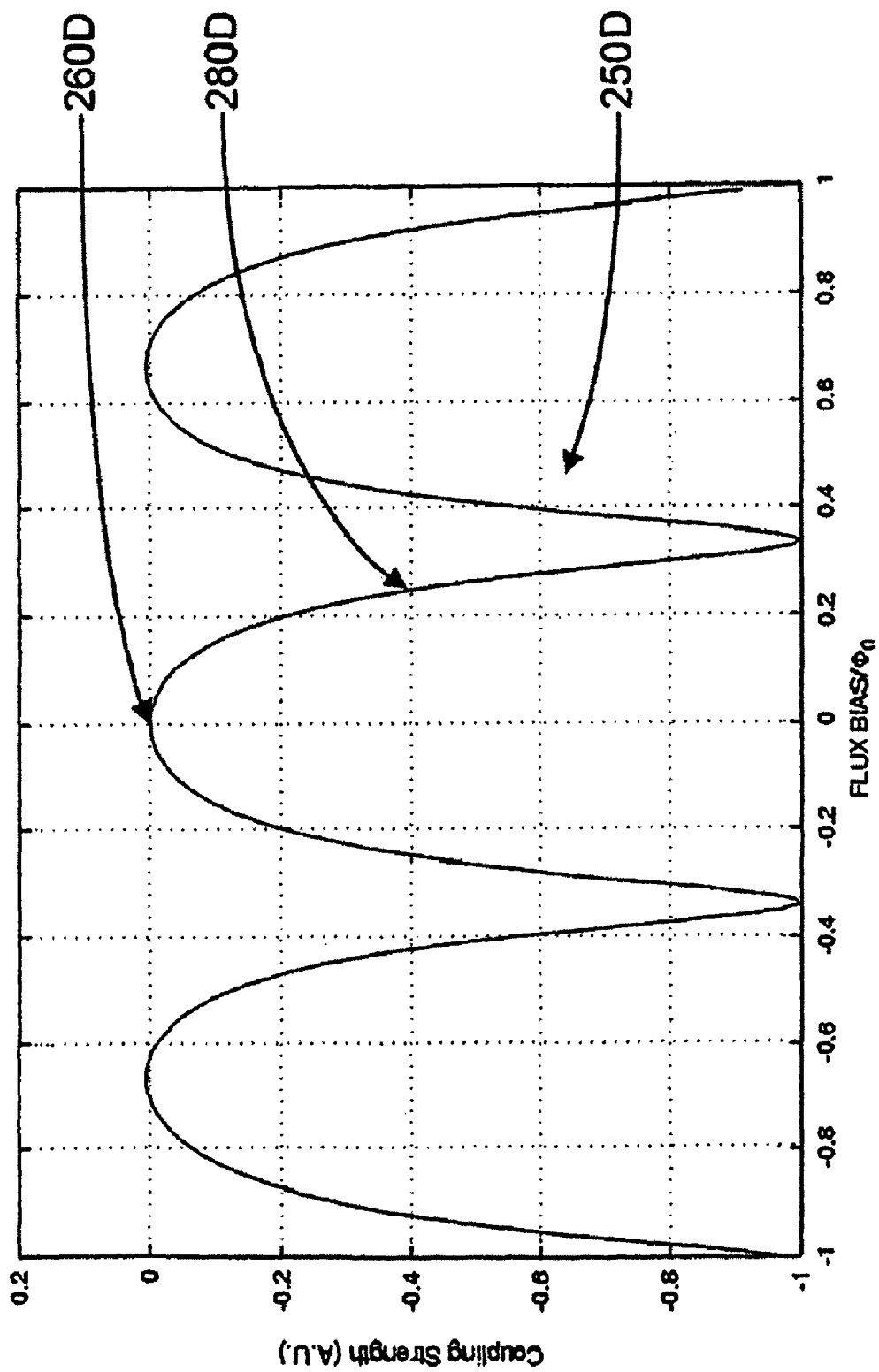
FIG. 2D is a graph of coupling strength versus magnetic flux applied to a loop of superconducting material of a controllable coupler.

FIG. 2D shows an exemplary graph 250D giving the relationship between the coupling strength (of arbitrary units) between first qubit 210 and second qubit 220 (Y-axis) as a function of flux bias 205A from magnetic flux transformer 230A being applied to first loop of superconducting material 201A scaled by the superconducting flux quantum $\Phi_0$ (X-axis). Note that flux bias 205B (the sum of flux 205B-1 and 205B-2) created by electrical current flowing through magnetic flux transformers 230B-1, 230B-2 is produced with about equal magnitude but opposite direction as that produced by flux bias 205A from magnetic flux transformer 230A.

Zero coupling exists between first qubit 210 and second qubit 220 when coupler 200 is set to point 260D or any other point along graph 250D with a similar coupling strength of zero as is exhibited by point 260D. Ferromagnetic coupling exists between first qubit 210 and second qubit 220 when coupler 200 is set to point 280D or any other point along graph 250D with a coupling strength greater than zero as is exhibited by point 270D. There may exist direct magnetic coupling interactions between first qubit 210 and second qubit 220 wherein an inherent coupling exists between first qubit 210 and second qubit 220 when no flux 205A or 205B (the sum of flux 205B-1 and 205B-2) created by electrical current flowing through magnetic flux transformers 230B-1, 230B-2 is produced.

A well defined zero coupling state 260D is attainable with no flux bias 205A or flux bias 205B applied to controllable coupler 200 in this embodiment of a controllable coupler 200. Having a zero-coupling state as the "off" state of controllable coupler 200 is a desirable characteristic of any coupler within an analog or quantum system. Since persistent current couplers' "off" state does not produce zero coupling, an iterative process is required during calibration of analog or quantum systems which incorporate persistent current couplers 100. This is a very difficult and time consuming process as before a qubit can be calibrated, the zero coupling state of couplers surrounding the qubit must be found. Couplers having an "off" state which produces zero-coupling allows for calibration of the analog or quantum system in a much more straitforward and less-iterative approach.

Figure 3:
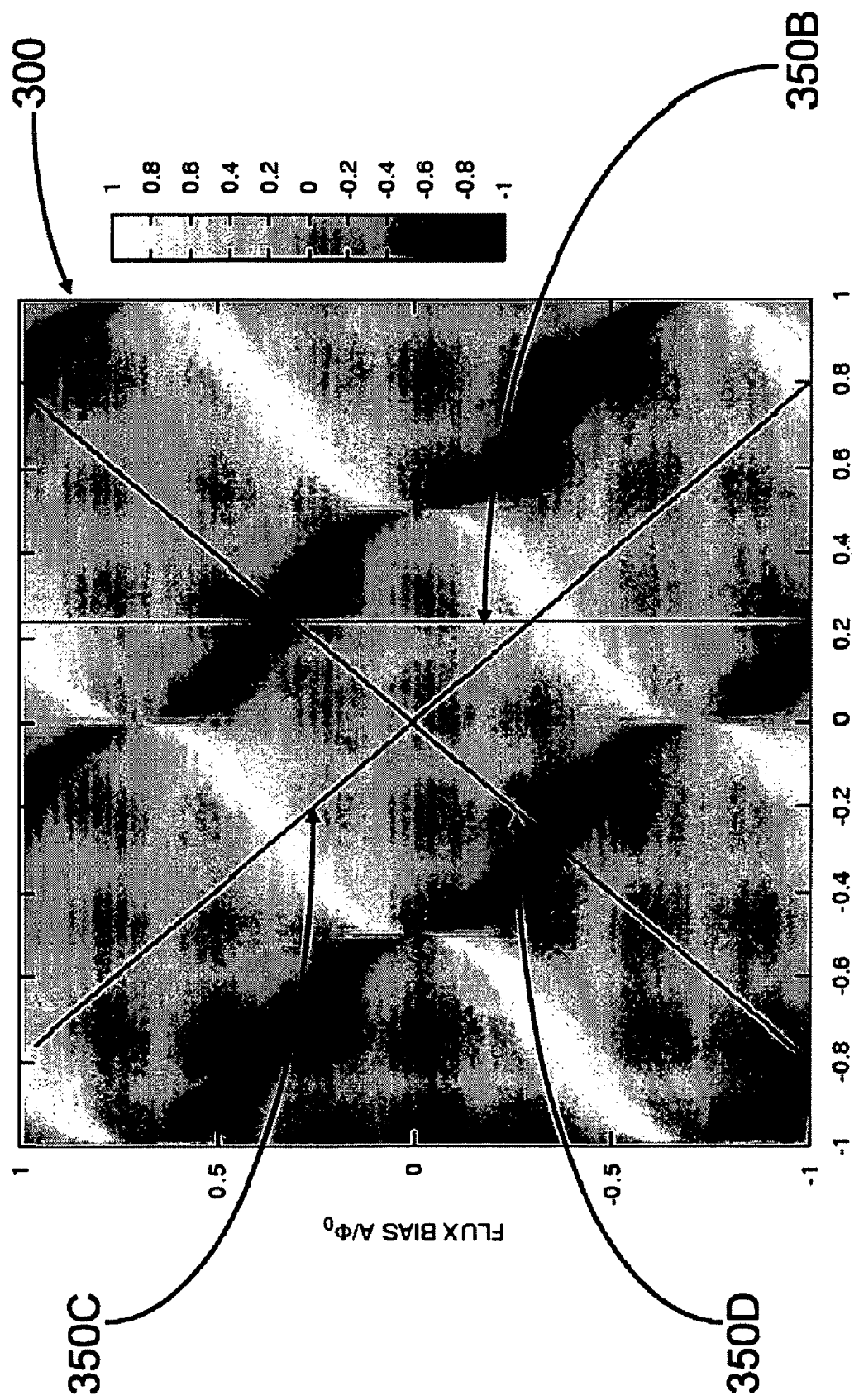
FIG. 3 is a topographical plot of the coupling strength of a controllable coupler.

FIG. 3 shows a topographical plot 300 of the coupling strength of controllable coupler 200. Plot 300 depicts how the coupling strength created by controllable coupler 200 is dependant upon both flux 205A from flux bias 230A (x-axis) and flux 205B (the sum of flux 205B-1 and 205B-2) from flux bias 230B (y-axis).

Line 350B denotes the contour used in the exemplary embodiment of FIG. 2B where zero coupling, anti-ferromagnetic couple and ferromagnetic coupling was producible by varying the amount of flux 205A being applied to coupler 200 by magnetic flux transformer 230A. Curve 250B was found by following the contour of line 350B.

Line 350C denotes the contour used in the exemplary embodiment of FIG. 2C where zero coupling and anti-ferromagnetic coupling was producible by varying flux 205A and flux 205B applied to coupler 200 in a proportional fashion by the respective magnetic flux transformers 230A and 230B. Curve 250C was found by following the contour of line 350C. When controllable coupler 200 is operated along line 350C, ferromagnetic coupling cannot be produced between first qubit 210 and second qubit 220.

Line 350D denotes the contour used in the exemplary embodiment of FIG. 2D where zero coupling and anti-ferromagnetic coupling was producible by varying flux 205A and flux 205B applied to the coupler 200 in a proportional but opposite fashion by the respective magnetic flux transformers 230A and 230B. Curve 250D was found by following the contour of line 350D. When the controllable coupler 200 is along line 350D, anti-ferromagnetic coupling cannot be produced between the first qubit 210 and the second qubit 220.

Further embodiments of the controllable coupler 200 may be realized by applying flux though magnetic flux transformers 230A and 230B in a predetermined fashion to map out further contours on the plot 300.

We claim:

1. A coupling system to couple a first qubit and a second qubit, the coupling system comprising:
   a first loop of superconducting material;
   a second loop of superconducting material;
   a first Josephson junction interrupting the first and the second loops of superconducting material;
   a second Josephson junction interrupting the second loop of superconducting material;
   a first magnetic flux inductor that forms at least a portion of a first mutual inductance interface to inductively couple the first loop of superconducting material with the first qubit;
   a second magnetic flux inductor that forms at least a portion of a second mutual inductance interface to inductively couple the first and the second loops of superconducting material with the second qubit;
   a third magnetic flux inductor forming a third mutual inductance interface to inductively couple the first loop to a first coupling state control structure; and
   a fourth magnetic flux inductor forming a fourth mutual inductance interface to inductively couple the second loop to a second coupling state control structure.

2. The coupling system of claim 1 wherein at least one of the first qubit and the second qubit is a superconducting flux qubit.

3. The coupling system of claim 1 wherein a flux provided to the third magnetic flux inductor by the first coupling state control structure at least partially controls a coupling state of the coupling system.

4. The coupling system of claim 3 wherein the coupling state is produced and a magnitude of a persistent current within at least one of the first and the second loop of superconducting material is at least approximately zero.

5. The coupling system of claim 3 wherein the coupling state of the coupling system is selected from a group consisting of anti-ferromagnetic coupling, ferromagnetic coupling and zero coupling.

6. The coupling system of claim 1 wherein a flux provided to the fourth magnetic flux inductor by the second coupling state control structure at least partially controls a coupling state of the coupling system.

7. The coupling system of claim 6 wherein the coupling state is produced and a magnitude of a persistent current within at least one of the first and the second loop of superconducting is at least approximately zero.

8. The coupling system of claim 6 wherein the coupling state of the coupling system is selected from a group consisting of anti-ferromagnetic coupling, ferromagnetic coupling and zero coupling.

9. The coupling system of claim 1 wherein the first coupling state control structure includes a fifth magnetic flux inductor positioned to inductively couple with the third magnetic flux inductor, the third and the fifth magnetic flux inductors forming a first magnetic flux transformer.

10. The coupling system of claim 9 wherein the second coupling state control structure includes a sixth magnetic flux inductor positioned to inductively couple with the fourth magnetic flux inductor, the fourth and the sixth magnetic flux inductors forming a second magnetic flux transformer.

11. A method of controllably coupling a first qubit and a second qubit with a coupling system, wherein the coupling system comprises a first and a second superconducting loop and a first and a second Josephson junction, and wherein the first Josephson junction interrupts both the first and the second superconducting loops and the second Josephson junction interrupts the second superconducting loop, the method comprising:
   coupling the first qubit to the first superconducting loop through a first mutual inductance interface;
   coupling the second qubit to both the first and the second superconducting loops through a second mutual inductance interface;
   applying a first amount of magnetic flux to the first superconducting loop through a third mutual inductance interface; and
   applying a second amount of magnetic flux to the coupling system second superconducting loop through a fourth mutual inductance interface.

12. The method of claim 11 wherein anti-ferromagnetic coupling is produced between the first qubit and the second qubit when at least one of the first amount of magnetic flux the second amount of magnetic flux is non-zero.

13. The method of claim 11 wherein ferromagnetic coupling is produced between the first qubit and the second qubit when at least one of the first amount of magnetic flux the second amount of magnetic flux is non-zero.

14. The method of claim 11 wherein at least one of the first qubit and the second qubit is a superconducting flux qubit.

15. The method of claim 11, further comprising:
adjusting the first amount of magnetic flux applied to the first superconducting loop.

16. The method of claim 15 wherein adjusting the first amount of magnetic flux causes a change in coupling between the first qubit and the second qubit.

17. The method of claim 11, further comprising:
adjusting the second amount of magnetic flux applied to the second superconducting loop.

18. The method of claim 17 wherein adjusting the second amount of magnetic flux causes a change in coupling between the first qubit and the second qubit.

19. The method of claim 11, further comprising:
adjusting the first amount of magnetic flux applied to the first superconducting loop; and
adjusting the second amount of magnetic flux applied to the second superconducting loop, wherein zero-coupling is produced between the first qubit and the second qubit when the first amount of magnetic flux and the second amount of magnetic flux are both at least approximately zero.

* * * * *

UNITED STATES PATENT AND TRADEMARK OFFICE
CERTIFICATE OF CORRECTION

| | | |
|---|---|---|
| PATENT NO. | : 7,800,395 B2 | Page 1 of 1 |
| APPLICATION NO. | : 12/113753 | |
| DATED | : September 21, 2010 | |
| INVENTOR(S) | : Mark W. Johnson et al. | |

It is certified that error appears in the above-identified patent and that said Letters Patent is hereby corrected as shown below:

Column 10, Lines 65-67:
"applying a second amount of magnetic flux to the coupling system second superconducting loop through a fourth mutual inductance interface." should read, --applying a second amount of magnetic flux to the second superconducting loop through a fourth mutual inductance interface.--.

Signed and Sealed this
Thirty-first Day of May, 2011

David J. Kappos
*Director of the United States Patent and Trademark Office*